United States Patent
Sato et al.

(10) Patent No.: US 12,498,518 B2
(45) Date of Patent: Dec. 16, 2025

(54) OPTICAL FIBER

(71) Applicant: SUMITOMO ELECTRIC INDUSTRIES, LTD., Osaka (JP)

(72) Inventors: Shin Sato, Osaka (JP); Yuki Kawaguchi, Osaka (JP); Takemi Hasegawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 244 days.

(21) Appl. No.: 18/266,079

(22) PCT Filed: Dec. 24, 2021

(86) PCT No.: PCT/JP2021/048287
§ 371 (c)(1),
(2) Date: Jun. 8, 2023

(87) PCT Pub. No.: WO2022/149498
PCT Pub. Date: Jul. 14, 2022

(65) Prior Publication Data
US 2024/0036251 A1  Feb. 1, 2024

(30) Foreign Application Priority Data
Jan. 7, 2021 (JP) .................. 2021-001521

(51) Int. Cl.
*G02B 6/02* (2006.01)
*G02B 6/036* (2006.01)

(52) U.S. Cl.
CPC .......... *G02B 6/02395* (2013.01); *G02B 6/02* (2013.01); *G02B 6/03627* (2013.01)

(58) Field of Classification Search
CPC ... G02B 6/02; G02B 6/02395; G02B 6/03627
See application file for complete search history.

(56) References Cited

U.S. PATENT DOCUMENTS 5,146,534 A    9/1992  Lines
5,410,428 A    4/1995  Yamagata et al.
(Continued)

FOREIGN PATENT DOCUMENTS

EP    3896502 A1    10/2021
JP    H05-043267 A   2/1993
(Continued)

OTHER PUBLICATIONS

Geissberger, A. E. et al., "Raman studies of vitreous SiO₂ versus fictive temperature," Physical Review B., Sep. 15, 1983, vol. 28, No. 6, pp. 3266-3271.
(Continued)

*Primary Examiner* — Ryan A Lepisto
(74) *Attorney, Agent, or Firm* — Faegre Drinker Biddle & Reath LLP (57) ABSTRACT

An optical fiber includes a core made of silica glass, and a cladding surrounding the core and made of silica glass. A product of a center wavenumber $k_{o4}$ and a half width at half maximum $k_{H4}$ of a peak of Raman scattered light $\omega_4(TO)$ obtained by irradiating the core with excitation light having a wavelength of 532 nm is 38000 cm$^{-2}$ or less.

10 Claims, 5 Drawing Sheets

(56) References Cited

U.S. PATENT DOCUMENTS

| | | | |
|---|---|---|---|
| 6,205,281 B1 * | 3/2001 | Bange | C03B 37/15 |
| | | | 501/40 |
| 7,489,850 B1 | 2/2009 | Berkey | |
| 2004/0053768 A1 | 3/2004 | Bourova et al. | |
| 2015/0370008 A1 | 12/2015 | Tamura et al. | |
| 2016/0147010 A1 | 5/2016 | Tamura et al. | |
| 2017/0305781 A1 * | 10/2017 | Haruna | C03C 3/06 |
| 2018/0128967 A1 | 5/2018 | Zhu et al. | |
| 2019/0324195 A1 | 10/2019 | Sakuma et al. | |

FOREIGN PATENT DOCUMENTS

| | | |
|---|---|---|
| JP | H06-048775 A | 2/1994 |
| JP | 2005-537210 A | 12/2005 |
| JP | 2006-058494 A | 3/2006 |
| JP | 2016-130786 A | 7/2016 |
| JP | 2018-517943 A | 7/2018 |
| WO | WO-2004/020357 A2 | 3/2004 |
| WO | WO-2005/021455 A2 | 3/2005 |

OTHER PUBLICATIONS

Little, D.J. et al., "Femtosecond laser modification of fused silica: the effect of writing polarization on Si-Oring structure," Opt. Express 16, 24, 20029, (2008).

Wang, R. P. et al., "Fluorine-doping concentration and fictive temperature dependence of self-trapped holes in $SiO_2$ glasses," J. Appl. Phys. 98, 023701 (2005).

* cited by examiner

OPTICAL FIBER

TECHNICAL FIELD

The present disclosure relates to an optical fiber.
Priority is claimed on Japanese Patent Application No. 2021-001521, filed Jan. 7, 2020, the content of which is incorporated herein by reference.

BACKGROUND ART

As an optical fiber with small Rayleigh scattering and low transmission loss, an optical fiber having a core containing an alkali metal element is known (for example, Patent Literature 1). In a case in which a core portion of an optical fiber preform contains an alkali metal element, a viscosity of the core portion can be reduced when the optical fiber preform is drawn, and relaxation of a network structure of quartz glass proceeds. Thus, a fictive temperature of glass in the optical fiber is lowered, and the transmission loss of the optical fiber can be reduced.

CITATION LIST

Patent Literature

[Patent Literature 1] Japanese Unexamined Patent Publication No. 2005-537210
[Patent Literature 2] Japanese Unexamined Patent Publication No. 2016-130786

Non-Patent Literature

[Non-Patent Literature 1] R. P. Wang et al., "Fluorine-doping concentration and fictive temperature dependence of self-trapped holes in glasses," J. Appl. Phys. 98, 023701 (2005)
[Non-Patent Literature 2] D. J. Little et al., "Femtosecond laser modification of fused silica: the effect of writing polarization on Si-ring structure," Opt. Express 16, 24, 20029, (2008)

SUMMARY OF INVENTION

Technical Problem

An optical fiber of the present disclosure includes a core made of silica glass, and a cladding surrounding the core and made of silica glass, wherein a product of a center wavenumber $k_{\omega 4}$ and a half width at half maximum $k_{H4}$ of a peak of Raman scattered light $\omega_4(TO)$ obtained by irradiating the core with excitation light having a wavelength of 532 nm is 38000 cm$^{-2}$ or less.

DESCRIPTION OF EMBODIMENTS

Problems to be Solved by the Present Disclosure

In addition to Rayleigh scattering, infrared absorption and absorption by OH groups contribute to an increase in transmission loss of optical fibers in a near-infrared region used as a communication band. The transmission loss due to infrared absorption increases due to a shift of an infrared absorption peak to the short wavelength side and an increase in a half-value width of the infrared absorption peak. Non-Patent Literature 1 describes that a wavenumber shift of the infrared absorption peak occurs due to a difference in additive elements. A position and half-value width of the infrared absorption peak are greatly affected by a strength and bond angle of a Si—O bond and thus react sensitively to a type and amount of the additive element and a crystal transition of glass. Therefore, even when a fictive temperature is low, the transmission loss due to infrared absorption may not necessarily be reduced according to partial crystallization and a profile of the additive element, and the transmission loss may worsen.

An object of the present disclosure is to provide an optical fiber with low transmission loss.

Effect of the Present Disclosure

According to the present disclosure, an optical fiber with low transmission loss can be provided.

DESCRIPTION OF EMBODIMENT OF THE PRESENT DISCLOSURE

First, the embodiments of the present disclosure will be listed and described. An optical fiber according to one embodiment includes a core made of silica glass and a cladding surrounding the core and made of silica glass, wherein a product of a center wavenumber $k_{\omega 4}$ and a half width at half maximum $k_{H4}$ of a peak of Raman scattered light $\omega_4(TO)$ obtained by irradiating the core with excitation light having a wavelength of 532 nm is 38000 cm$^{-2}$ or less.

The optical fiber can reduce transmission loss.
In the above optical fiber, the half width at half maximum $k_{H4}$ may be 36 cm$^{-1}$ or less. In this case, the product of the center wavenumber $k_{\omega 4}$ and the half width at half maximum $k_{H4}$ of the peak of the Raman scattered light $\omega_4(TO)$ is easily set to 38000 cm$^{-2}$ or less.

In the above optical fiber, the center wavenumber $k_{\omega 4}$ may be 1070 cm$^{-1}$ or less. In this case, the product of the center wavenumber $k_{\omega 4}$ and the half width at half maximum $k_{H4}$ of the peak of Raman scattered light $\omega_4(TO)$ is easily set to 38000 cm$^{-2}$ or less.

In the above optical fiber, the core may contain an alkali metal element. In this case, since the Rayleigh scattering is curbed, the transmission loss can be further reduced.

DETAILS OF EMBODIMENT OF THE PRESENT DISCLOSURE

A specific example of the optical fiber of the present disclosure will be described below with reference to the drawings. The present invention is not limited to the exemplifications, but is indicated by the scope of the claims and is intended to include all modifications within the meaning and scope of equivalents of the scope of the claims. In the description of the drawings, the same elements are denoted by the same reference numerals, and overlapping descriptions will be omitted.

Figure 1:
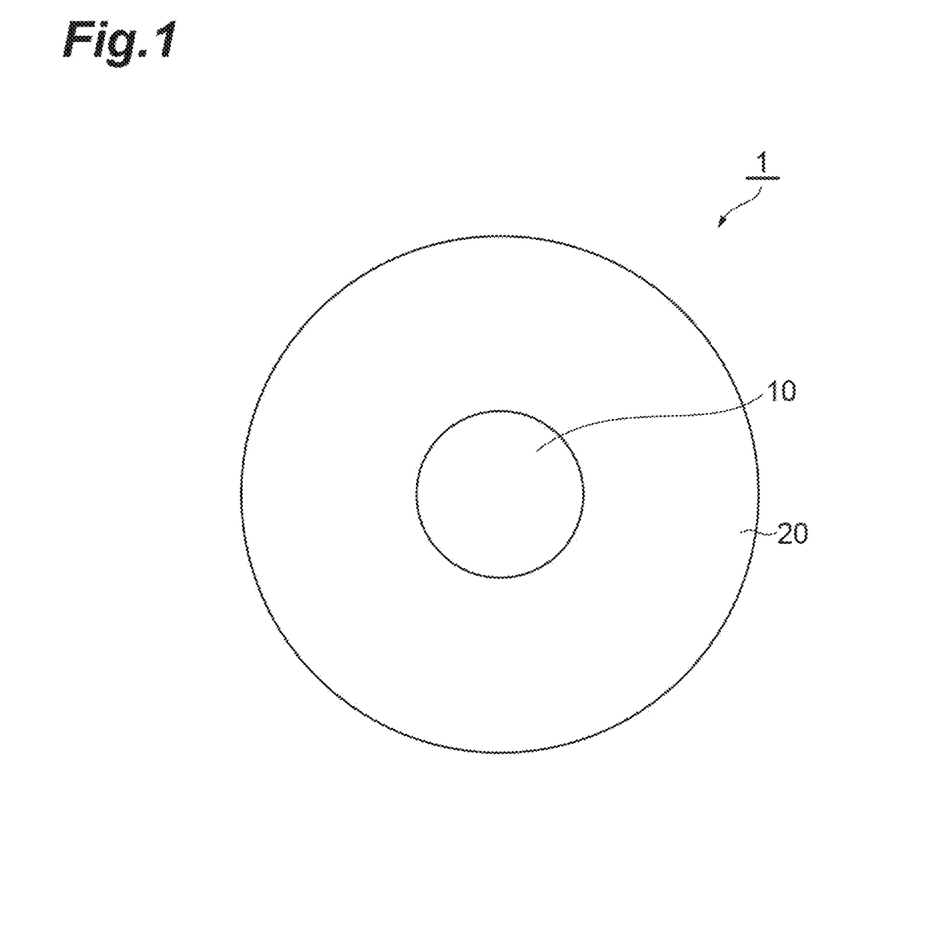
FIG. 1 is a cross-sectional view of an optical fiber according to an embodiment.

FIG. 1 is a cross-sectional view of an optical fiber according to an embodiment. As shown in FIG. 1, the optical fiber 1 according to the embodiment includes a core 10 and a cladding 20. The core 10 is made of silica glass and contains, for example, an alkali metal element such as potassium, fluorine, or chlorine. Rayleigh scattering can be curbed and transmission loss can be reduced by including an alkali metal element in the core 10. The core 10 is substantially free of Ge and has a Ge mass fraction of 0.1% or less. A diameter (a core diameter) of the core 10 is, for example, 6 μm or more and 18 μm or less. The cladding 20 surrounds the core 10. The cladding 20 is made of silica glass and contains, for example, fluorine and chlorine. The cladding 20 has a refractive index lower than that of the core 10.

In the optical fiber 1 according to the embodiment, the product of a center wavenumber $k_{\omega 4}$ and a half width at half maximum $k_{H4}$ of a peak of Raman scattered light $\omega_4(TO)$ obtained by irradiating the core 10 with excitation light having a wavelength of 532 nm is 38000 cm$^{-2}$ or less. The product is preferably 37500 cm$^{-2}$ or less and more preferably 33000 cm$^{-2}$ or less. The half width at half maximum $k_{H4}$ is, for example, 36 cm$^{-1}$ or less. The center wavenumber $k_{\omega 4}$ is, for example, 1070 cm$^{-1}$ or less.

Here, a Raman scattering spectrum will be described. In general, when a substance is irradiated with light, an interaction between the light and the substance (molecular vibration) generates Raman scattered light having a wavelength different from that of the irradiation light. A structure of the substance at a molecular level can be analyzed from the Raman scattering spectrum obtained by spectroscopy of the Raman scattered light. A plurality of peaks occur in the Raman scattering spectrum according to the number of vibration modes of atomic bonds in the substance.

Figure 2:
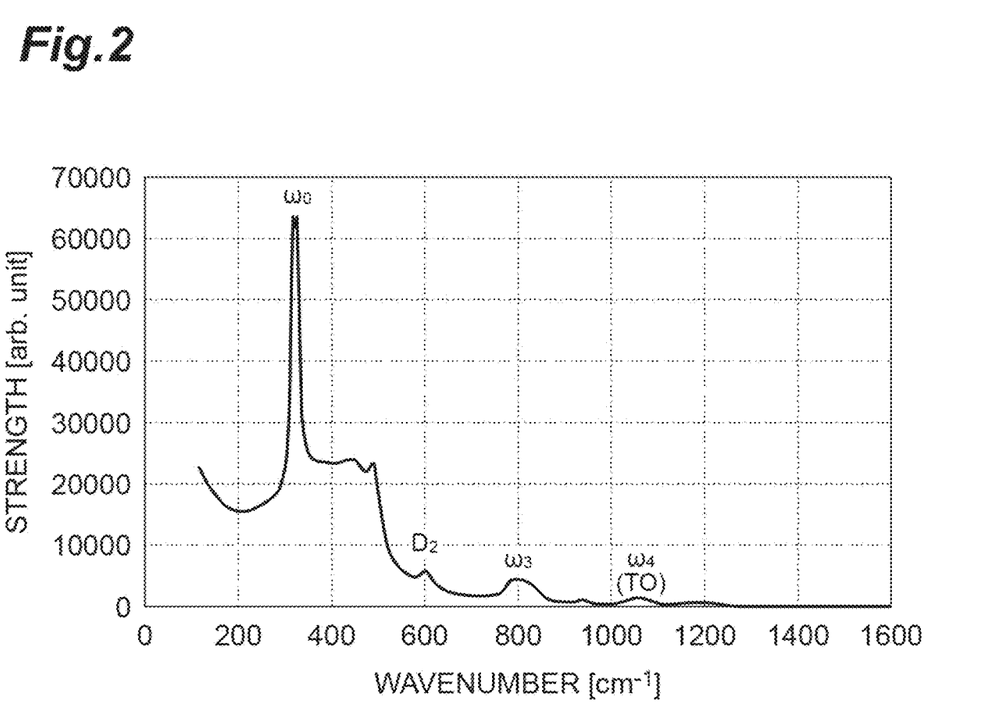
FIG. 2 is a diagram showing a Raman scattering spectrum of silica glass.

FIG. 2 is a diagram showing a Raman scattering spectrum obtained by irradiating quartz-based glass (silica glass) with a laser beam having a wavelength of 532 nm. In FIG. 2, a horizontal axis indicates a Raman shift (cm$^{-1}$), and a vertical axis indicates an intensity. In the Raman scattering spectrum shown in FIG. 2, a peak of Raman scattered light $\omega_0$ of calcium fluoride caused by a sample stage is observed in a wavenumber range of 300 cm$^{-2}$ or more and 350 cm$^{-2}$ or less. A peak of Raman scattered light $\omega_3$ due to Si—O stretching vibration is observed in a wavenumber range of 750 cm$^{-1}$ or more and 875 cm$^{-1}$ or less. A peak of Raman scattered light $D_2$ attributed to a silica three-membered ring structure is observed in a wavenumber range of 565 cm$^{-2}$ or more and 640 cm$^{-2}$ or less. A peak of Raman scattered light $\omega_4(TO)$ due to Si—O stretching vibration is observed in a wavenumber range of 1000 cm$^{-2}$ or more and 1100 cm$^{-2}$ or less. A peak of Raman scattered light $\omega_4(TO)$ originates from scattered light of a transverse wave generated by asymmetric stretching vibration of Si—O among vibration modes of the Si—O bond (Non-Patent Literature 2).

Wavenumber positions of these peaks (that is, the center wavenumbers) are greatly affected by a bond strength and bond angle of Si—O constituting silica glass. A bonding state thereof gives rise to a slight wavenumber shift according to a type and amount of added elements, or partial crystallization of the glass. The wavenumber shift reflects a change in the bond strength and bond angle of atomic bonds due to the additive elements.

Infrared absorption, like Raman scattering, is a phenomenon related to the interaction between vibration of an atomic bond and light. Therefore, also in the infrared absorption, a wavenumber shift occurs in the same direction as the Raman scattered light $\omega_4(TO)$ under the same conditions. Incidentally, in an infrared absorption spectrum, generally, a plurality of peaks tend to overlap each other due to coupling of Si—O vibration modes, making it difficult to distinguish the peaks. Also, from the viewpoint of comparison with an intensity ratio $I_{ratio}$ which will be described below, the Raman scattered light $\omega_4(TO)$ of the Raman spectrum can be said to be more suitable for quantitatively evaluating the wavenumber shift and the half-value width. Therefore, in the optical fiber according to the present embodiment, a change in transmission loss due to the infrared absorption is evaluated using the Raman scattering spectrum.

The optical fiber according to the embodiment is manufactured by adjusting drawing conditions, for example, in order to curb the transmission loss due to the infrared absorption. Specifically, in order to curb the crystal transition of SiO$_2$ and the precipitation of additives, a cooling rate is increased immediately after fiberization so that the optical fiber does not stay in a temperature range in which the optical fiber is likely to crystallize (1200° C. or higher and 1700° C. or lower) for a long time and quenched. Quenching is performed in a temperature range of, for example, 2000° C. to 1200° C. Helium (He) gas, for example, can be used as an atmosphere gas for quenching. The optical fiber after quenching is, for example, exposed to atmospheric temperature once and then slowly cooled by passing through a heating mechanism (a slow cooling furnace) at about 900° C. to 1200° C. Nitrogen (N$_2$) gas, for example, can be used as the atmosphere gas during slow cooling in order to increase heat retention by the heating mechanism and to reduce a fictive temperature.

The Raman scattering spectrum of the optical fiber is measured, for example, by microscope Raman spectroscopy similar to that of Patent Literature 2. That is, a laser beam with a wavelength of 532 nm output from a semiconductor laser device is condensed to irradiate an end surface of the optical fiber with a spot diameter of about 2 pin. The exposure is performed twice for a cumulative time of 30 seconds. The intensity of the laser beam is an oscillation output of 1 W (approximately 100 mW at the end surface of the optical fiber). Then, the end surface of the optical fiber is vertically irradiated with the laser beam, and the Raman scattering spectrum is measured by a back scattering arrangement.

Next, a method for quantitatively deriving the wavenumber shift in the Raman scattering spectrum will be described.

1. Correction of Wavenumber Shift in Raman Scattering Spectrum

An artifactual shift of the wavenumber position in the Raman scattering spectrum may occur due to the measurement conditions. Therefore, first, a peak position of the Raman scattered light $\omega_0$ is defined to correct the artifact generated in the measurement. Specifically, the peak of the Raman scattered light $\omega_0$ is fitted with the following Gaussian function, and the center wavenumber $k_{\omega 0}$ of the peak of the Raman scattered light $\omega_0$ obtained by fitting is set to 321 cm$^{-1}$ ($k_{\omega 0}$=321 cm$^{-1}$).

$$I = I_0 \exp(-\alpha_0 (k-k_{\omega 0})^2)$$

Here, I is the intensity, k is the wavenumber, 10 is the maximum intensity of the Raman scattered light $\omega_0$ (the intensity at the center wavenumber $k_{\omega 0}$), and $\alpha_0$ is a coefficient.

2. Determination of Center Wavenumber of Raman Scattered Light $\omega_4(TO)$

Next, the fitting of the Raman scattering spectrum is performed with the following Gaussian function in a range of the wavenumber from 1000 cm$^{-1}$ or more and 1100 cm$^{-1}$ or less. Since the influence of a baseline is small in this wavenumber region, baseline correction may not be performed and may be performed.

$$I=I_1 \exp(-\alpha_4(k-k_{\omega 4})^2)$$

Here, I is the intensity, k is the wavenumber, $I_1$ is the maximum intensity (the intensity at the center wavenumber $k_{\omega 4}$ and $\alpha_4$ is a coefficient. A center value of the Gaussian function obtained by fitting is defined as the center wavenumber $k_{\omega 4}$, and a half width at half maximum of the Gaussian function is defined as the half width at half maximum $k_{H4}$.

Figure 3:
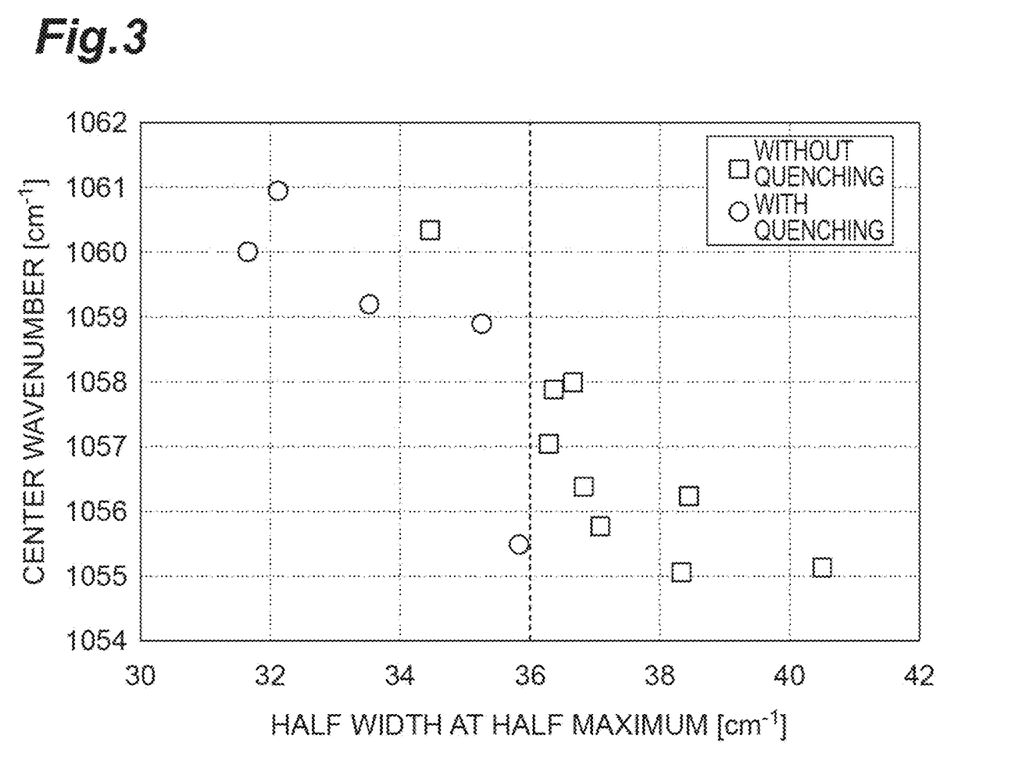
FIG. 3 is a graph showing a relationship between a center wavenumber $k_{\omega 4}$ and a half width at half maximum $k_{H4}$.

FIG. 3 is a graph showing the relationship between the center wavenumber $k_{\omega 4}$ and the half width at half maximum $k_{H4}$. In FIG. 3, a horizontal axis indicates the half width at half maximum $k_{H4}$ (cm$^{-1}$), and a vertical axis indicates the center wavenumber $k_{\omega 4}$ (cm$^{-1}$). Here, a plurality of optical fibers were manufactured by changing the cooling conditions (the presence or absence of quenching, temperature of the slow cooling furnace, slow cooling time, atmosphere gas, and the like) immediately after fiberization, and the center wavenumber $k_{\omega 4}$ and the half width at half maximum $k_{H4}$ of the peak of the Raman scattered light $\omega_4$(TO) were obtained for each optical fiber by the above-described method. In FIG. 3, an optical fiber manufactured by quenching immediately after fiberization (referred to as an "optical fiber with quenching") and an optical fiber manufactured without quenching immediately after fiberization (referred to as an "optical fiber without quenching") are shown separately. In particular, it is desirable to use manufacturing conditions such as changing the atmospheric gas between the quenching and the slow cooling.

As the center wavenumber $k_{\omega 4}$ and the half width at half maximum $k_{H4}$ increases, it has an adverse effect on the transmission loss in the near-infrared communication band. As shown in FIG. 3, the half width at half maximum $k_{H4}$ tends to decrease as the center wavenumber $k_{\omega 4}$ increases. Compared with the optical fiber without quenching, the optical fiber with quenching can reduce the half width at half maximum $k_{H4}$ for the same center wavenumber $k_{\omega 4}$. All of the optical fibers with quenching have a half width at half maximum of 36 cm$^{-1}$ or less. For the optical fibers without quenching, all but one have a half width at half maximum greater than 36 cm$^{-1}$. Such a difference is thought to be due to a fact that the quenching curbed the crystal transition of $SiO_2$.

Figure 4:
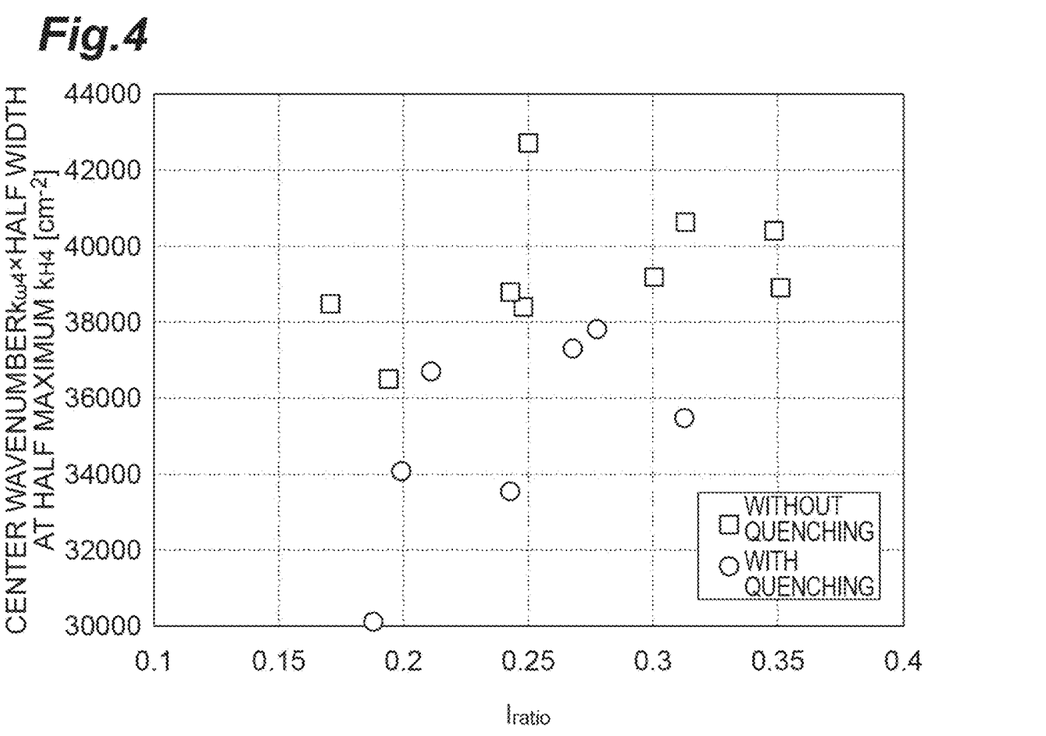
FIG. 4 is a graph showing the relationship between a product $k_{\omega 4} k_{H4}$ and an intensity ratio $I_{ratio}$.

FIG. 4 is a graph showing the relationship between the product $k_{\omega 4} \times k_{H4}$ and the intensity ratio $I_{ratio}$. In FIG. 4, a horizontal axis indicates the intensity ratio $I_{ratio}$, and a vertical axis indicates the product k 4 $k_{H4}$ (cm$^{-2}$) of the center wavenumber $k_{\omega 4}$ (cm$^{-1}$) and the half width at half maximum $k_{H4}$ (cm$^{-1}$). The intensity ratio $I_{ratio}$ is a ratio $I_{D2}/I_{\omega 3}$ between the intensity $I_{\omega 3}$ of the Raman scattered light $\omega_3$ and the intensity $I_{D2}$ of the Raman scattered light Dz. Patent Literature 2 describes that in an optical fiber containing silica glass as a main component, as the intensity ratio $I_{ratio}$ becomes smaller, the silica glass becomes uniform, the Rayleigh scattering is reduced, and thus the transmission loss is lowered.

As shown in FIG. 4, the product $k_{\omega 4} \times k_{H4}$ and the intensity ratio $I_{ratio}$ do not have a strong correlation and have relatively large variations. This is probably because the center wavenumber and the half width at half maximum of the Raman scattered light vary greatly according to the degree of crystallization, the amount of the additive element, and the type of the additive element. In the optical fiber with quenching, a value of the product $k_{\omega 4} \times k_{H4}$ can be significantly reduced by controlling the half width at half maximum $k_{H4}$ and the center wavenumber $k_{\omega 4}$ as compared with the optical fiber without quenching. This can be said to be the result of having reduced the half width at half maximum $k_{H4}$ in the optical fiber with quenching. An optical fiber with a product $k_{\omega 4} \times k_{H4}$ of 30000 cm$^{-2}$ is obtained.

Figure 5:
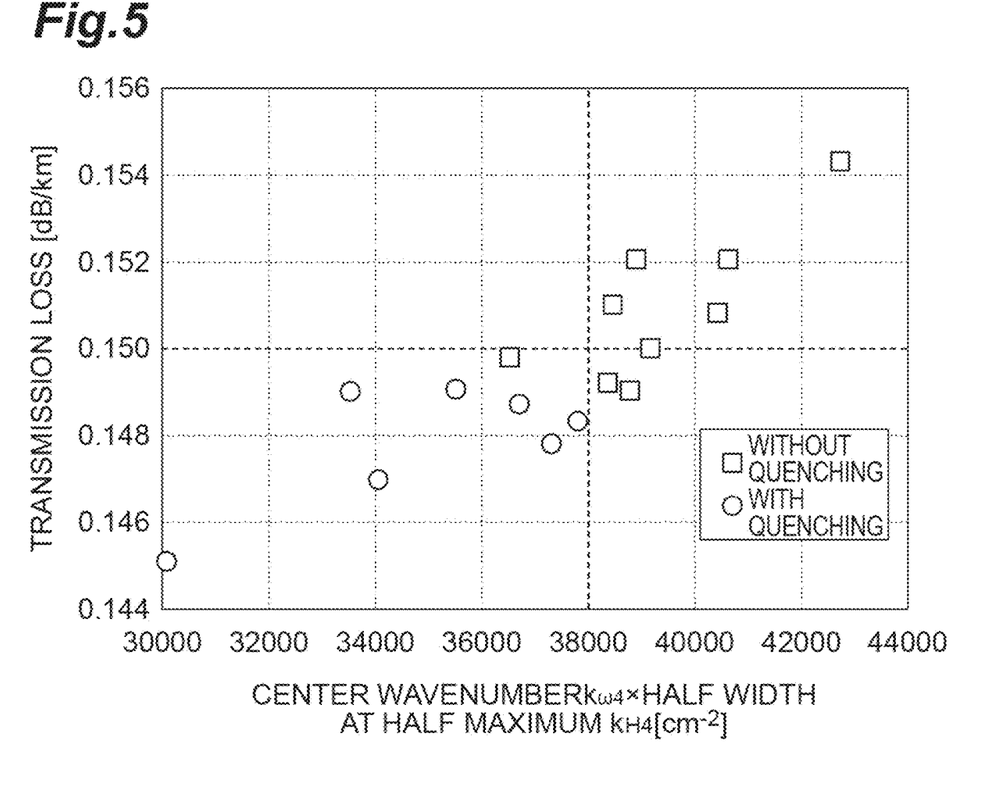
FIG. 5 is a graph showing a relationship between transmission loss and the product $k_{\omega 4} \times k_{H4}$.

FIG. 5 is a graph showing the relationship between transmission loss and product $k_{\omega 4} \times k_{H4}$. In FIG. 5, a horizontal axis indicates the product $k_{\omega 4} \times k_{H4}$ (cm$^{-2}$) of the center wavenumber $k_{\omega 4}$ (cm$^{-1}$) and the half width at half maximum $k_{H4}$ (cm$^{-1}$), and a vertical axis indicates the transmission loss (dB/km). As shown in FIG. 5, the transmission loss tends to decrease as the value of the product $k_{\omega 4} \times k_{H4}$ decreases. While the transmission loss increases or decreases due to various factors such as impurities, the product $k_{\omega 4} \times k_{H4}$ represents an essential loss change factor that changes due to the structure of silica glass. An optical fiber having a product $k_{\omega 4} \times k_{H4}$ of 38000 cm$^{-2}$ or less achieves a transmission loss of 0.15 dB/km or less. It is more preferably 37500 cm$^{-2}$ or less, and still more preferably 33000 cm$^{-2}$ or less. Thus, the transmission loss is 0.149 dB/km or less, and preferably 0.146 dB/km or less. All of the optical fibers with quenching have a product $k_{\omega 4} \times k_{H4}$ of 38000 cm$^{-2}$ or less, and a transmission loss of 0.15 dB/km or less. For the optical fibers without quenching, all but one have a half width at half maximum greater than 36 cm$^{-1}$ and a transmission loss greater than 0.15 dB/km.

REFERENCE SIGNS LIST

1 Optical fiber
10 Core
20 Cladding

The invention claimed is:

1. An optical fiber comprising:
   a core made of silica glass; and
   a cladding surrounding the core and made of silica glass,
   wherein a product of a center wavenumber $k_{\omega 4}$ and a half width at half maximum $k_{H4}$ of a peak of Raman scattered light $\omega_4$(TO) obtained by irradiating the core with excitation light having a wavelength of 532 nm is 38000 cm$^{-2}$ or less,
   wherein the half width at half maximum $k_{H4}$ is 36 cm$^{-1}$ or less,
   wherein $\omega_4$(TO) originates from scattered light of a transverse wave generated by asymmetric stretching vibration of Si—O among vibration modes of the Si—O bond, and $k_{\omega 4}$ and $k_{H4}$ are affected by a bond strength and bond angle of Si—O constituting silica glass.

2. The optical fiber according to claim 1, wherein the center wavenumber $k_{\omega 4}$ is 1070 cm$^{-1}$ or less.

3. The optical fiber according to claim 1, wherein the core contains an alkali metal element.

4. The optical fiber according to claim 1, wherein transmission loss is 0.15 dB/km or less.

5. The optical fiber according to claim 1, wherein the product is 37500 cm$^{-2}$ or less.

6. The optical fiber according to claim 1, wherein transmission loss is 0.149 dB/km or less.

7. The optical fiber according to claim 1, wherein the product is 33000 cm$^{-2}$ or less.

8. The optical fiber according to claim 1, wherein transmission loss is 0.146 dB/km or less.

9. The optical fiber according to claim 1, wherein a Ge mass fraction of the core is 0.1% or less.

10. The optical fiber according to claim 1, wherein a diameter of the core is 6 μm or more and 18 μm or less.

* * * * *